United States Patent
Tanaka et al.

(10) Patent No.: US 8,716,914 B2
(45) Date of Patent: May 6, 2014

(54) STATOR OF VEHICLE AC GENERATOR AND METHOD FOR MANUFACTURING THE SAME

(75) Inventors: Kazunori Tanaka, Chiyoda-ku (JP); Takatoshi Masuda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 70 days.

(21) Appl. No.: 13/319,593

(22) PCT Filed: Jun. 23, 2009

(86) PCT No.: PCT/JP2009/061395
§ 371 (c)(1),
(2), (4) Date: Nov. 9, 2011

(87) PCT Pub. No.: WO2010/150354
PCT Pub. Date: Dec. 29, 2010

(65) Prior Publication Data
US 2012/0062065 A1    Mar. 15, 2012

(51) Int. Cl.
*H02K 15/02* (2006.01)
(52) U.S. Cl.
USPC ....... 310/216.004; 310/216.065; 310/216.044
(58) Field of Classification Search
USPC .............. 310/216.004, 216.017, 216.044, 310/216.048, 216.065, 216.067, 216.096, 310/216.097, 216.111, 216.113, 179, 193, 310/216.001, 214, 215
IPC ..................................................... H02K 15/02
See application file for complete search history.

(56) References Cited

U.S. PATENT DOCUMENTS

| | | | |
|---|---|---|---|
| 4,007,386 A * | 2/1977 | Rustecki | 310/166 |
| 4,651,039 A * | 3/1987 | Yamamoto et al. | 310/87 |
| 2002/0175589 A1 * | 11/2002 | Takizawa et al. | 310/180 |
| 2004/0046632 A1 | 3/2004 | Kumano et al. | |
| 2006/0279161 A1 | 12/2006 | Hitomi et al. | |
| 2007/0188289 A1 | 8/2007 | Kumano et al. | |
| 2008/0246354 A1 | 10/2008 | Asao et al. | |

FOREIGN PATENT DOCUMENTS

| | | |
|---|---|---|
| JP | 1-278242 A | 11/1989 |
| JP | 5-68352 A | 3/1993 |
| JP | 6-327203 A | 11/1994 |
| JP | 7-161558 A | 6/1995 |

(Continued)

OTHER PUBLICATIONS

Translation of JP 07161558 A into US English using JPO webpage translation, Hirai et al, all pages.*

(Continued)

*Primary Examiner* — Terrance Kenerly
*Assistant Examiner* — Naishadh Desai
(74) *Attorney, Agent, or Firm* — Sughrue Mion, PLLC

(57) ABSTRACT

In a vehicle AC generator, a stator core (42) is formed by laminating thin steel sheets, the stator core (42) being provided with a plurality of slot portions (43) which accommodate a stator winding (41) and tooth portions (44) which define adjacent ones of the slot portions; the stator winding (41) is disposed in the slot portions to constitute a stator (4); the stator core (42) is filled with varnish (45) between laminates of each tooth (44) at least in an inner diameter end surface region which faces the rotor (3) and is coated with epoxy resin varnish (46) on the tooth surface of the inner diameter end surface region to form an anti-rust film.

7 Claims, 4 Drawing Sheets

(56) References Cited

FOREIGN PATENT DOCUMENTS

| | | | | |
|---|---|---|---|---|
| JP | 07161558 A | * | 6/1995 | ............ H01F 41/02 |
| JP | 10145988 A | | 5/1998 | |
| JP | 2001-78399 A | | 3/2001 | |
| JP | 2004129480 A | | 4/2004 | |
| JP | 2006-345671 A | | 12/2006 | |
| JP | 2006345671 A | | 12/2006 | |
| JP | 2008-259329 A | | 10/2008 | |

OTHER PUBLICATIONS

Korean Office Action, Patent Appln No. 10-2011-7027926, Sep. 26, 2012.

Japanese Office Action dated May 14, 2013 issued in corresponding Japanese Patent Application No. 2011-519415.

* cited by examiner

STATOR OF VEHICLE AC GENERATOR AND METHOD FOR MANUFACTURING THE SAME

CROSS REFERENCE TO RELATED APPLICATIONS

This application is a National Stage of International Application No. PCT/JP2009/061395 filed on Jun. 23, 2009, the contents of all of which are incorporated herein by reference in their entirety.

TECHNICAL FIELD

The present invention relates to a stator of a vehicle AC generator to be installed on a vehicle or the like and a method for manufacturing the same.

BACKGROUND ART

As a conventional stator for use in a vehicle AC generator, in a stator core formed by a plurality of laminated cores having tooth portions and slot portions, there is one in which an electrodeposition coating film made of insulation resin is formed on a rotor-facing surface (a surface facing a rotor) in the tooth portion (for example, see Patent Document 1).

Patent Document 1 discloses that a continuous film with no unevenness can be formed with a sufficient film thickness even in a case where a coating film is insufficient when impregnation coating with a brush or spray coating is performed, the case including the space between laminates.

Furthermore, as other conventional example, for example, Patent Document 2 discloses one in which irregularities between strip-shaped bodies in an inner diameter direction of a stator core are eliminated to avoid inward protrusion of edges of the strip-shaped bodies, this makes it possible to perform coating for uniform anti-rust to prevent the occurrence of the locked state of rotation due to rust generated between a rotor and a stator and to eventually prevent performance defects, and the amount of coating to be used for anti-rust of the inner periphery of the stator can be reduced.

RELATED ART DOCUMENT

Patent Document

Patent Document 1: Japanese Unexamined Patent Publication No. H1-278242
Patent Document 2: Japanese Unexamined Patent Publication No. 2006-345671

SUMMARY OF THE INVENTION

Problems to be Solved by the Invention

However, in the conventional stator disclosed in Patent Document 1, the tooth portion needs to be grounded as a cathode in order to form the electrodeposition coating film; but, this results in a problem in that the tooth portion is almost covered after a stator coil is wound and there is little space for grounding.

More particularly, in a stator provided with slots and teeth whose number is 1.5 times or 2 times as much as the number of conventional slots and teeth, it is in a state where the width of the tooth is narrower and an obtainable space is little more and more. Furthermore, masking needs to be individually performed for a portion where resin coating is not needed; not only work is troublesome throughout the whole, but also much investment in facilities is needed; and thus, it is not suitable for mass production.

Furthermore, in other conventional example disclosed in Patent Document 2, only the irregularities between the strip-shaped bodies in the inner diameter direction of the stator core are eliminated (perfect circle dimension), but any countermeasure is not taken against the space between the laminates.

In the case of coating the inner peripheral surface of the stator in which a space exists between the laminates, for example, when the inner peripheral surface is coated with paint that is high in anti-rust properties but is low in penetration properties, there is a problem in that paint is unnecessarily drawn between the laminates due to direct advance properties of sprayed spray and it is difficult to ensure the required coating thickness of the cylindrical inner peripheral surface.

This invention has been made to solve the problem as described above, and an object of the present invention is to provide a stator of a vehicle AC generator and a method for manufacturing the same, in which uniformization of a coating film on the inner diameter end surface of a tooth facing a rotor is easy, anti-rust properties are excellent, process is simple, much investment in facilities is not needed, and manufacture can be performed inexpensively.

Means for Solving the Problems

According to the present invention, there is provided a stator of a vehicle AC generator, the vehicle AC generator including: a case which incorporates or removably supports constituent components; a shaft rotatably supported on the case; a rotor which has pole cores secured on the shaft and a field winding placed in the pole cores; a stator which includes a stator core located on the periphery of the rotor and to be held in sandwiched relation in the case, and a stator winding disposed in the stator core; a rectifier which rectifies AC electromotive force generated in the stator winding to DC; and a voltage regulator which restricts generated electric power to a specified value. The stator core is formed by laminating thin steel sheets, the stator core being provided with a plurality of slot portions which accommodate the stator winding and tooth portions which define adjacent ones of the slot portions; and the stator winding is disposed in the slot portions to constitute the stator. The stator core is filled with varnish between the laminates of each tooth at least in an inner diameter end surface region which faces said rotor, and is coated with epoxy resin varnish on the tooth surface of the inner diameter end surface region to form an anti-rust film.

Furthermore, in a method for manufacturing the stator of the vehicle AC generator, the method includes a step of filling the varnish between the laminates of each tooth; and a step of trickling the varnish into the stator winding to be disposed in the core slot portions, the filling step being performed at the same time as the trickling step.

Advantageous Effect of the Invention

According to the present invention, it is possible to obtain a stator of a vehicle AC generator and a method for manufacturing the same, in which uniformization of a resin film on an inner diameter end surface of a tooth facing a rotor is easy, anti-rust properties are excellent, process is simple, much investment in facilities is not needed, and manufacture can be performed inexpensively.

The foregoing and other object, features, and advantages of the present invention will become more apparent from the following detailed description of embodiments and description shown in the accompanying drawings.

MODE FOR CARRYING OUT THE INVENTION

Figure 1:
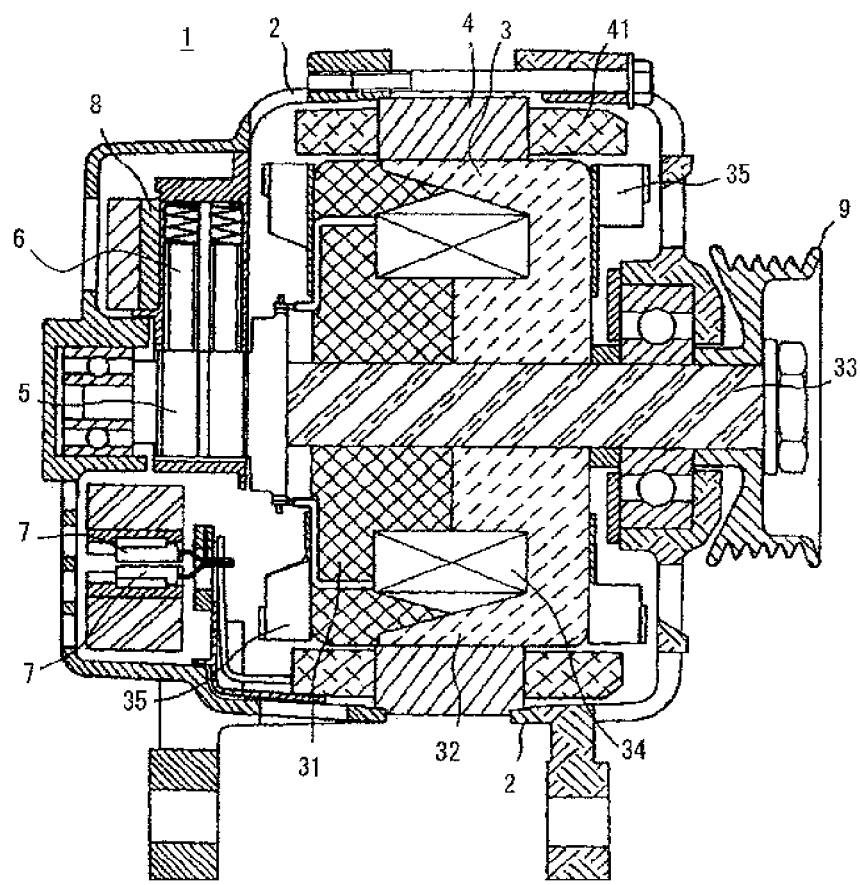
FIG. 1 is a schematic sectional view of a vehicle AC generator according to Embodiment 1 of the present invention.

Embodiments of the present invention will be described below in detail with reference to drawings.

Incidentally, the same reference numerals as those shown in the respective drawings represent the same or corresponding elements.

Embodiment 1

Figure 2:
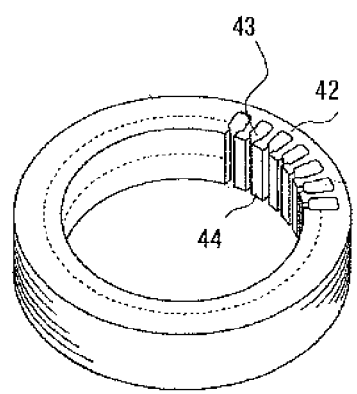
FIG. 2 is a schematic perspective view of a stator core according to Embodiment 1 of the present invention.

FIG. 1 is a schematic sectional view of a vehicle AC generator according to Embodiment 1 of the present invention; and FIG. 2 is a perspective view in which only a core portion of a stator shown in FIG. 1 is taken out.

First, the whole structure of the vehicle AC generator will be described with reference to FIG. 1.

In FIG. 1, a vehicle AC generator 1 includes a case 2 which surrounds and removably supports constituent components in the inside thereof, a shaft 33 rotatably supported on the case 2, a rotor 3 secured on the shaft 33 and rotatably disposed in the case 2, cooling fans 35 secured on the axial ends of the rotor 3, a stator 4 held by the case 2 so as to surround the rotor 3, a pair of slip rings 5 which are secured on a rear side end portion of the shaft 33 and supply a field current to a field winding 34 of the rotor 3, a brush 6, a rectifier 7 which is electrically connected to the stator 4 and rectifies AC generated by the stator 4 to DC, and a voltage regulator 8 which regulates the magnitude of AC voltage generated by the stator 4.

The rotor 3 includes a field winding 34 which generates magnetic flux by flowing through the field current, and pole cores 31, 32 which are provided so as to enclose the field winding 34 to form magnetic poles by the magnetic flux. Furthermore, the stator 4 includes a stator core 42 (to be described later), and a stator winding 41 which is wound around the stator core 42 and generates AC by a change in magnetic flux from the field winding 34 with the rotation of the rotor 3. The stator 4 is disposed so as to surround the rotor 3 and is attached to the case 2.

Next, the stator 4 will be described in detail.

FIG. 2 is the perspective view showing the stator core 42 of the stator 4; and the stator core 42 is formed by overlapping a predetermined number of thin steel sheets with a plurality of slot portions 43 provided in the inner diameter side thereof, the slot portions accommodating the stator winding 41. Each tooth portion 44 is formed between the slots.

Figure 3:
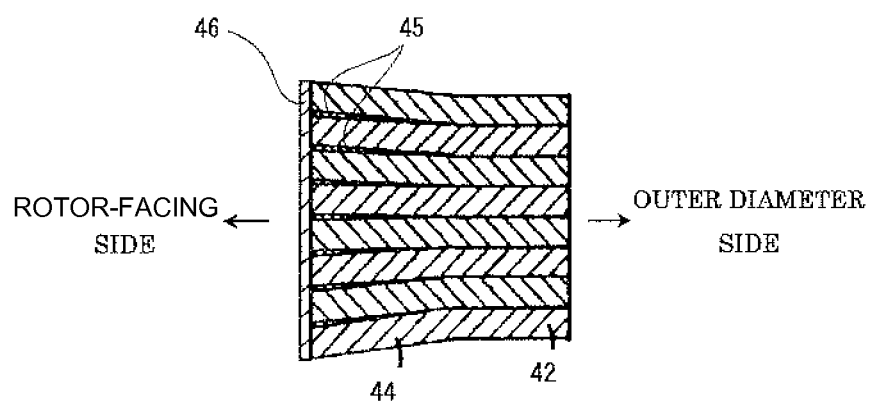
FIG. 3 is an axial sectional view of a stator core shown in FIG. 2.
Figure 4:
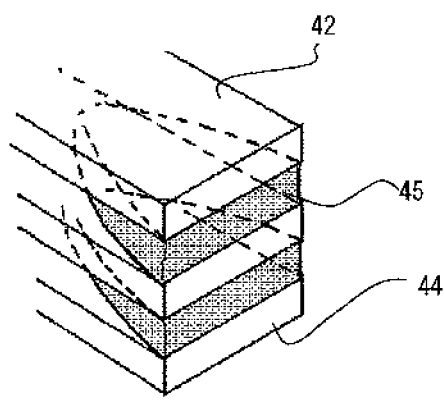
FIG. 4 is a schematic perspective view in which the stator core shown in FIG. 2 is seen from the end of a tooth prior to spray coating.

As shown in FIG. 3 that is an axial sectional view of the tooth region, the laminated steel sheets are separated between the laminates respectively on the inner diameter side (the side facing the rotor, i.e., the rotor-facing side) of the stator core 42; and the separated part is filled with varnish 45. As shown in FIG. 4, a state where the varnish 45 is filled is a state where the end surfaces 44 of the core 42 and the varnish layers 45 constitute a series of inner diameter end surfaces.

Next, a method for filling varnish will be described.

Varnish to be used is Tris-(2-hydroxyethyl)isocyanurate (THEIC) denatured unsaturated polyester, which is varnish to be conventionally filled in coil ends of the stator winding. Varnish is filled in the space between laminated cores at the same time as a varnish trickling step in which the varnish is trickled into the stator winding; and accordingly, process is simple, additional facilities are not needed, and the varnish can be filled between the laminated cores.

Figure 5:
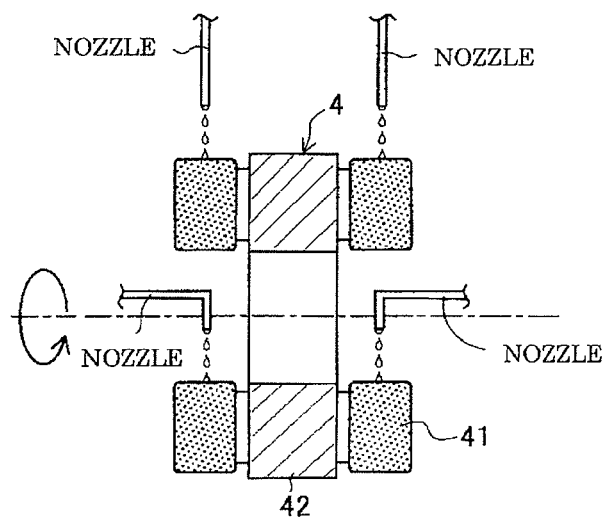
FIG. 5 is an explanation view showing a state where varnish treatment is applied to a stator.

That is, as shown in FIG. 5, for the purpose of ensuring insulation properties, improving heat resistance properties, and promoting heat dissipation, the varnish 45 is trickled to the stator winding 41 to impregnate the varnish 45 in the winding while rotating the stator 4 in which the stator winding 41 is disposed. At this time, for example, in the case of the step where the varnish 45 is trickled from the inner diameter side of the stator winding 41, a nozzle for trickling varnish is moved toward the tooth side; and accordingly, the varnish can be radially trickled between the laminates of the tooth 44. When the varnish is filled, the filling is performed after the stator core and the stator winding are heated to high temperature; and therefore, if the varnish is trickled, the varnish lowers in viscosity immediately to be lubricious and the varnish is penetrated into the stator winding and the space between the laminated cores, and the varnish is provided being extended in a tongue shape toward the base between the laminates of tooth portions.

Figure 6:
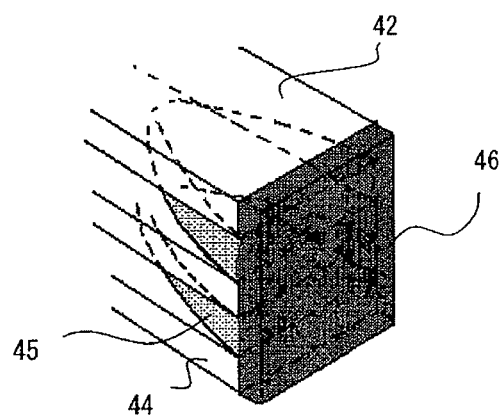
FIG. 6 is a schematic perspective view in which the stator core shown in FIG. 2 is seen from the end of the tooth.

After the varnish is filled, epoxy resin varnish (specially denatured epoxy resin paint) 46 is spray-coated to the tooth surface of the core inner diameter side (the rotor-facing side); and accordingly, an anti-rust film with uniform film thickness can be formed as shown in FIG. 6.

The separation between the laminates of the tooth region can be obtained by controlling axial dimension of only the outer diameter side after the thin steel sheets are laminated. The outer side is controlled; and accordingly, the inner diameter side (the rotor-facing side) end surface tends to be axially expanded.

Incidentally, in the above description, the varnish to be filled in the space between the laminated cores is different from the varnish to be applied to the inner diameter end surface of the tooth; however, these varnishes may be the same varnish.

What matters is, as long as varnish is preliminarily filled in the space between the laminated cores to fill in the space and then the varnish is applied to the inner diameter end surface of the tooth, it is easy to form a uniform film on the inner diameter end surface of the tooth and the amount of the varnish can be reduced.

As described above, according to Embodiment 1 of the present invention, a defect in which varnish is drawn in the spaces of the side surfaces of the coating surface is eliminated and a product which reliably ensures the paint thickness on the tooth surface can be obtained, the defect being occurred in the case of using epoxy resin varnish which adopts spray coating because of high in anti-rust properties but lower in penetration properties than varnish.

Accordingly, even when salty water or the like sticks at the time of installing on a vehicle, the epoxy resin varnish with high anti-rust properties covers the inner diameter side surface of the stator tooth with sufficient film thickness; and therefore, this avoids to generate rust between the inner diameter side surface of the stator tooth and the rotor to prevent from locking rotation that may cause a performance defect.

Furthermore, the varnish is filled in the space between the laminated cores; and accordingly, air in the space is eliminated, thermal conductivity is more enhanced than a state where only laminated because of via the varnish, and heat dissipation properties of the laminated cores are increased and the reduction effect of temperature can be obtained.

Furthermore, varnish (that is, a resin film) with less variation in thickness is applied between the laminated cores; and accordingly, damper function can be obtained and electromagnetic oscillation peculiar to a generator can be attenuated.

Further, penetration of the varnish into the space between the laminated cores is performed at the same time as the varnish trickling step into the stator winding and therefore additional facilities are not needed; and residual heat is conducted across the stator core and the stator winding and thus penetration properties of the varnish are not impaired and the varnish can be smoothly filled between the laminated cores.

Embodiment 2

Figure 7:
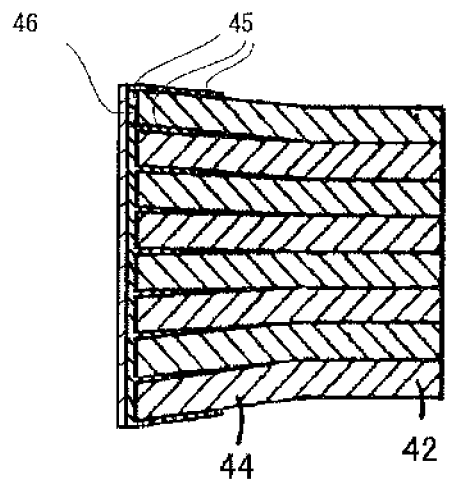
FIG. 7 is an axial sectional view of a stator core according to Embodiment 2 of the present invention.

FIG. 7 shows a sectional view of a stator core according to Embodiment 2 of the present invention.

In FIG. 3 of the aforementioned Embodiment 1, there has been exemplified the case where the varnish 45 is filled in only the space between laminates of the cores; however, in Embodiment 2, viscosity of varnish or a coated state is selected and accordingly varnish 45 is filled in the space between laminates of teeth and coated to the end surface of the core inner diameter side.

According to Embodiment 2, as compared to Embodiment 1, the amount of coating of subsequently provided epoxy resin varnish is small and there is an advantage in cost that is expected to be improved.

Embodiment 3

Figure 8:
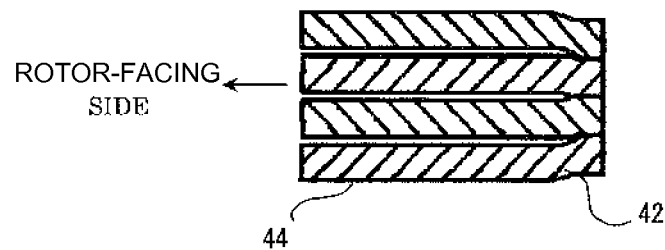
FIG. 8 is an axial sectional view of a stator core according to Embodiment 3 of the present invention.

FIG. 8 shows an axial sectional view of a stator core according to Embodiment 3 of the present invention.

In the aforementioned Embodiment 1 and Embodiment 2, there has been described the case where the space between the laminates is configured so that only the end side of the tooth (that is, the side of the rotor-facing surface) is axially expanded; however, in Embodiment 3, as shown in FIG. 8, a space is configured in almost the whole portion other than an outermost diameter region of a stator core. Then, varnish is filled in a slot depth direction, that is, toward a radial direction from the inner diameter end surface side to the outer diameter side of the core, at least by a length not less than the height of a stator winding in the slot, the stator winding being disposed in the slot portions.

According to Embodiment 3, the varnish is also expanded from the side surface in the radial direction of the tooth to the stator winding disposed in the slot; and therefore, it is possible to obtain a product having a better state as compared to a state where the varnish is filled into the winding portion in the slot, the filling of the varnish into the winding portion being performed by capillary phenomenon from winding regions protruded from slot axial end portions.

Embodiment 4

Figure 9:
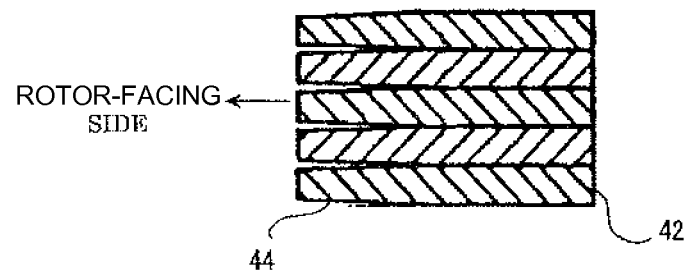
FIG. 9 is an axial sectional view of a stator core according to Embodiment 4 of the present invention.

FIG. 9 shows an axial sectional view of a stator core according to Embodiment 4 of the present invention.

Embodiment 4 uses one in which the sheet thickness of thin steel sheets which form a tooth portion of a stator core 42 is not uniform, but the sheet thickness of the inner diameter side of the tooth portion is thinner than that of other portion (a central portion or an outline portion).

The present invention is not limited to such laminated configuration in which the sheet thickness is uniform, but the configuration in which the inner diameter side of the tooth portion becomes thinner is also applicable and similar effects to Embodiment 1 can also be obtained in Embodiment 4.

INDUSTRIAL APPLICABILITY

The present invention is applied to an AC generator to be installed on a vehicle.

DESCRIPTION OF REFERENCE NUMERALS

1 Vehicle AC generator, 2 Case, 3 Rotor, 31, 32 Pole core, 33 Shaft, 34 Field winding, 4 Stator, 41 Stator winding, 42 Stator core, 43 Slot portion, 44 Tooth portion, 45 Varnish, 46 Epoxy resin varnish, 5 Slip ring, 6 Brush, 7 Rectifier, and 8 Voltage regulator.

The invention claimed is:

1. A stator of a vehicle AC generator, said vehicle AC generator comprising:
   a case which incorporates or removably supports constituent components;
   a shaft rotatably supported on said case;
   a rotor which has pole cores secured on said shaft and a field winding placed in said pole cores;
   a stator which includes a stator core located on the periphery of said rotor and to be held in sandwiched relation in said case, and a stator winding disposed in said stator core;
   a rectifier which rectifies AC electromotive force generated in said stator winding to DC; and
   a voltage regulator which restricts generated electric power to a specified value,
   wherein said stator core is formed by laminating steel sheets, said stator core being provided with a plurality of slot portions which accommodate said stator winding and a plurality of tooth portions, a tooth portion of the plurality of tooth portions is adjacent to each slot portion of the plurality of slot portions;
   said stator winding is disposed in the plurality of slot portions to constitute said stator; and
   said stator core having a layer of varnish filled between the laminates of each tooth portion, the layer of varnish being at least disposed in an inner diameter end surface region which faces said rotor, and having an epoxy resin varnish coated on a surface of each tooth portion, over the layer of varnish, to form an anti-rust film with a uniform thickness, the surface being located in the inner diameter end surface region,
   wherein the epoxy resin varnish is only disposed on the surface of each tooth portion of the plurality of tooth portions and is not disposed across plurality of slot portions.

2. The stator of the vehicle AC generator according to claim 1,
wherein said varnish is filled between the laminates of said teeth and coated to the end surface of the inner diameter end surface region.

3. The stator of the vehicle AC generator according to claim 1,
wherein said varnish is filled between the laminates of said teeth toward a radial direction from the inner diameter end surface region to the outer diameter side of the core, at least by a length not less than the height of said stator winding in the slot, said stator winding being disposed in the slot portions.

4. The stator of the vehicle AC generator according to claim 1,
wherein said steel sheets which form the tooth portion use one in which the sheet thickness thereof on an inner diameter side of the tooth portion is thinner than that of other portion.

5. The stator of the vehicle AC generator according to claim 1,
wherein an inner diameter tooth surface is formed as the innermost region of the tooth portion, extending a length of the stator core in the axial direction and positioned along a circumference of the inner diameter of the stator core.

6. A method for manufacturing the stator of the vehicle AC generator comprising:
a step of filling varnish between laminates of each tooth; and
a step of trickling said varnish into a stator winding to be disposed in a plurality of core slot portions,
the filling step being performed at a same time as the trickling step,
wherein said vehicle AC generator includes:
a case which incorporates or removably supports constituent components;
a shaft rotatably supported on said case;
a rotor which has pole cores secured on said shaft and a field winding placed in said pole cores;
a stator which includes a stator core located on the periphery of said rotor and to be held in sandwiched relation in said case, and the stator winding disposed in said stator core;
a rectifier which rectifies AC electromotive force generated in said stator winding to DC; and
a voltage regulator which restricts generated electric power to a specified value,
wherein said stator core is formed by laminating steel sheets, said stator core being provided with the plurality of slot portions which accommodate said stator winding and tooth portions which define adjacent ones of the slot portions;
said stator winding is disposed in the slot portions to constitute said stator; and
said stator core is filled with said varnish between the laminates of each tooth at least in an inner diameter end surface region which faces said rotor, and is coated with epoxy resin varnish on the tooth surface of the inner diameter end surface region to form an anti-rust film.

7. The method for manufacturing the stator of the vehicle AC generator according to claim 6,
wherein said epoxy resin varnish is coated to the tooth surface by spray coating.

* * * * *